Patented July 13, 1948

2,445,301

UNITED STATES PATENT OFFICE 2,445,301

INFLUENZA VACCINE

Leslie A. Chambers, Upper Darby, Pa., assignor to The Trustees of the University of Pennsylvania, Philadelphia, Pa., a corporation of Pennsylvania No Drawing. Application December 5, 1941, Serial No. 421,781

14 Claims. (Cl. 167—78).

This invention relates to influenza vaccines containing a complex broadly referred to as a basic-protein-precipitant-influenza virus complex or aggregate and also relates to the complex and the preparation of it and of the vaccines.

I have found that advantageous vaccines effective in the prophylaxis of influenza comprise the influenza virus, either the living virus, fully virulent or attenuated, or the inactivated virus, associated with a basic-protein-precipitant as a so-called basic - protein - precipitant - influenza virus complex or aggregate having a very exceedingly low percentage of sensitizing proteins incapable of eliciting antibody response to the virus, that is, proteins from the medium in which the virus was propagated and which upon injection might produce undesirable disagreeable reactions. These vaccines possess a high antigenic potency higher than that of influenza vaccines that could be obtained by any of the heretofore known practical means, and, on administration, elicit the production of antibodies capable of neutralizing the virus.

Likewise, the complex or aggregate may contain the fully active virus, or the attenuated or the inactivated virus.

The vaccines, as well as the complex or aggregate alone, may contain separately any of the influenza virus types or strains, for example, type A or type B, or any desired combination thereof.

The method of preparing the complex or aggregate according to the invention comprises the essential step of adding a suitable or desired basic-protein-precipitant, preferably in solution or suspension, to a suitable active, attenuated or inactivated influenza virus-bearing material, preferably in liquid form, for example, the separate or combined influenza virus infected amniotic and allantoic fluids accompanying chick or other fowl embryos. The quantity of the basic-protein-precipitant need be only sufficient effectively to form, under the reaction conditions, the amount of complex that could be practically produced from the quantity of virus-containing material employed. When necessary, the hydrogen ion concentration of the reaction mixture is adjusted to a point to permit the effective precipitation of the complex. The precipitated complex is separated by suitable means such as sedimentation preferably by centrifugal force followed by decantation, and, with or without subsequent washing with suitable washes, the complex may be preserved by suitable means, for example, by vacuum desiccation from the frozen state.

The vaccines may be put up directly from the complex at any of the described stages after its formation, or, depending on the starting virus-infected material, may involve suitable washing preferably with a solution that does not dissolve the complex, for example, a one percent aqueous solution of protamine or other basic-protein-precipitant, after which the complex is advantageously re-suspended in a solution suitable for injection such as a buffered salt solution. Such re-suspension may be to any desired concentration and advantageously to any higher concentration than that of the virus in the original material in which it was propagated even up to ten times, or more, that concentration. If desired, there may be added to the vaccine any other desired agents such as a suitable preservative, for example, phenyl mercuric nitrate.

Among the suitable basic-protein-precipitants are included especially the basic proteins particularly those relatively simple basic proteins obtainable from the sperm of fish, such as the protamines, as spermine, clupeine, salmine, scombrine, cyclopterine, sturine, salmiridine and the like; and also the histones exemplified by thymus histone and the like, and also the globins, for example, globin, the animal protein existing in hemoglobin. Also included are the basic degradation products of the protamines, such as result from hydrolysis progressively, as the protones, the polypeptides and the basic amino acids, exemplified by arginine, histidine, lysine and citrulline. The histone esters or hydrolysates, for example, the hydrolysates of histone obtained by boiling thymus histone in known manner with sulfuric acid and separating the hydrolysate by addition of alcohol, or the esters of histone obtained by introducing hydrogen chloride into a suspension of histone in methanol and adding ether to precipitate the hydrochloride of the ester are also included. Along with the polypeptides may be considered the decarboxylated derivatives thereof referred to as decarboxy-polypeptides, so that both polypeptides and decarboxy-polypeptides may be broadly termed polypeptide substances. Thus, the expression basic-protein-precipitant is used generically herein and in the claims to embrace broadly the precipitating agents, whether natural or synthetic, capable of precipitating the virus to form the desired complex or aggregate therewith, and it includes, only by way of example, the basic proteins and basic degradation products of proteins, given hereinabove as illustrative types.

The invention may be illustrated by, but not restricted to, the following examples:

Example 1

In spite of their low total protein content, the fluids of the allantoic sac (allantois) and the amniotic sac (amnion) accompanying chick embryos infected with influenza virus, for example, of type A, contain large amounts of both the active influenza virus and the complement fixation antigen. Although these fluids, singly or combined, have a relatively small amount of cellular debris and while dialysis will eliminate therefrom the uric acid along with readily dialyzable substances, non-dialyzable substances other than virus, for example egg proteins, remain in the fluids in relatively large amounts. To 100 cc. of untreated allantoic and amniotic fluids containing the influenza virus, is added about 20 cc. of an aqueous solution containing 10 mg. per cc. of spermine. As the pH is in the neighborhood of 8.3, a precipitate appears immediately, which precipitate is the spermine-influenza virus complex or aggregate. The precipitate is separated by sedimentation preferably assisted by centrifuging the mixture, for example, in the angle centrifuge at 5000 R. P. M. The supernatant liquid is drawn off. The precipitate (complex) is a yellow to creamy, fibrous, stringy mass, characterized by low solubility in water or salt solutions. Upon resuspending the complex or aggregate in a buffered physiological saline solution to a volume of 100 cc., there is obtained a solution effective as a vaccine, which vaccine contains only about 0.4% of the nitrogen contained by the original infected egg fluid used as the starting material.

Used as a vaccine on mice, this solution of the spermine-influenza virus complex showed a protection equal to that exhibited by the whole extra-embryonic fluid (untreated infected allantoic and amniotic fluids) despite the fact that only a relatively small portion of the total egg fluid protein was present.

Example 2

Twenty cc. of a 1% aqueous solution of protamine is added to 100 cc. of clear extra-embryonic fluid (allantoic and amniotic fluids) containing influenza virus of type B. The pH being about 8.3, a precipitate appears immediately as evidenced by the turbidity showing up in the mixture. The precipitate is then sedimented by centrifugation and the supernatant liquid is decanted, leaving the precipitate which is the protamine-influenza virus complex or aggregate, having the same physical appearance as the aggregate of Example 1. Upon resuspending the precipitated complex in buffered salt solution to the original volume of 100 cc., the preparation shows approximately the same virus infectivity as the original infected fluid starting material.

Example 3

Clear extra-embryonic fluid containing the virus of type A, as in Example 1, was first attenuated by the addition of one part of formalin per thousand and then treated with the protamine as in Example 1. The pH was about 8.0 and the aggregate precipitated had the physical appearance of and was worked up in the same manner as that of Example 1, the final product showing the same activity as that of Example 1.

Example 4

Clear extra-embryonic fluid containing the virus of type A, as in Example 1, was first attenuated by exposure to ultraviolet light for between seven to ten minutes and then treated with the protamine as in Example 1. The pH was about 8.0 and the aggregate precipitated had the physical appearance of and was worked up in the same manner as that of Example 1, the final product showing the same activity as that of Example 1.

The aggregate and the vaccine in each of the above examples possess complement fixation antigen.

These examples are merely illustrative of the process of the invention as well as of the basic-protein-precipitant-influenza virus complex or aggregate and of the vaccines of the invention, of which the protamine-influenza virus complex vaccines are especially useful.

While the above examples show the treatment of the infected extra-embryonic fluids directly with the basic-protein-precipitant without any dialysis, it is also possible to carry out the same process and to obtain the same complex vaccines after the extra-embryonic fluid is first dialyzed to eliminate, for example, the uric acid. In either case, the aggregate may be rid of any occluded dialyzable substances by dialysis after suspending the separate aggregate in a minimum amount of suitable liquid.

While in the above examples the pH of the reaction mixture was about 8.3, in such cases where the pH is outside of the range of from about 7.0 to about 9.0, the pH should be adjusted to within that range in the case of precipitation with a protamine.

While the inactivation in Example 3 was effected by using one part of Formalin in one thousand parts of virus-containing starting material, the inactivation may be similarly carried out by using one part of Formalin in from about five hundred to about ten thousand parts of virus-containing starting material. While the inactivation was carried out on the starting material as shown in Examples 3 and 4, an avirulent complex or vaccine may also be obtained by using the active virus starting material as in Examples 1 and 2 and carrying out the inactivation of the virus after the complex of Examples 1 and 2 has been precipitated, by using any desired inactivating treatment, such as with ultraviolet light, or with a chemical such as Formalin.

Since the precipitated complex obtained in the process is readily re-suspended, whenever desired, the complex may be washed one or more times with a liquid in which it does not dissolve, such as an aqueous 1% protamine solution or similar solution of any other basic-protein-precipitant.

While the invention has been illustrated by certain specific embodiments thereof, it is understood that certain substitutions or modifications can be made therein, for in place of the specific type or strain of virus or the specific basic-protein-precipitant used in the examples, any other suitable type or strain of the virus or species or type of basic-protein-precipitant or other infected starting material may be employed according to the invention which is intended to be limited to the available scope of the appended claims.

I claim:

1. An influenza vaccine eliciting in man or other animals the production of antibodies capable of neutralizing the corresponding influenza virus, comprising influenza virus associated with a basic-protein-precipitant as a basic-protein-precipitant-influenza virus complex.

2. An influenza vaccine eliciting in man or other animals the production of antibodies capable of neutralizing the corresponding influenza virus, comprising a basic-protein-precipitant-influenza virus complex, in which the basic-protein-precipitant is a basic degradation product of a protamine.

3. An influenza vaccine eliciting in man or other animals the production of antibodies capable of neutralizing the corresponding influenza virus, comprising a basic-protein-precipitant-influenza virus complex, in which the basic-protein-precipitant is at least one of the protamines.

4. An influenza vaccine eliciting in man or other animal the production of antibodies capable of neutralizing the corresponding influenza virus comprising a basic-protein-precipitant-influenza virus complex, in which the basic-protein-precipitant is at least one of the protamines, and the influenza virus portion thereof is of the virulent form.

5. An influenza vaccine eliciting in man or other animal the production of antibodies capable of neutralizing the corresponding influenza virus comprising a basic-protein-precipitant-influenza virus complex, in which the basic-protein-precipitant is at least one of the protamines, and the influenza virus portion thereof is of a form other than the virulent form.

6. An influenza vaccine eliciting in man or other animals the production of antibodies capable of neutralizing the corresponding influenza virus, comprising protamine-influenza virus complex.

7. An influenza vaccine eliciting in man or other animals the production of antibodies capable of neutralizing the corresponding influenza virus, comprising a basic-protein-precipitant-influenza virus complex, in which the basic-protein-precipitant is a protamine, and in which the influenza virus is of type A.

8. A basic-protein-precipitant-influenza virus complex capable of being made up as a vaccine eliciting in man or other animals the production of antibodies which can neutralize the corresponding influenza virus.

9. A basic-protein-precipitant-influenza virus complex capable of being made up as a vaccine eliciting in man or other animals the production of antibodies which can neutralize the corresponding influenza virus, in which the basic-protein-precipitant is a protamine.

10. In the preparation of an influenza vaccine eliciting in man or other animals the production of antibodies capable of neutralizing the corresponding influenza virus, the step of mixing a basic-protein-precipitant with influenza virus-containing material whereby there is precipitated therein a basic-protein-precipitant-influenza virus complex.

11. The preparation of an influenza vaccine eliciting in man or other animals the production of antibodies capable of neutralizing the corresponding influenza virus, which comprises mixing a protamine with infected fowl egg extra-embryonic fluids, separating the resultant protamine-influenza virus complex formed therein and resuspending said complex in a liquid medium suitable for injection.

12. The preparation of a basic-protein-precipitant-influenza virus complex capable of being made up as a vaccine eliciting in man or other animals the production of antibodies which can neutralize the corresponding influenza virus, which comprises mixing a basic-protein-precipitant with influenza virus-containing material at a hydrogen ion concentration adapted to permit effective precipitation of said complex, separating the complex and desiccating it while retaining its capacity to elicit the production of antibodies capable of neutralizing the virus.

13. An influenza vaccine eliciting in man or other animals the production of antibodies capable of neutralizing the corresponding influenza virus, comprising a basic-protein-precipitant-influenza virus complex, in which the basic-protein-precipitant is a protamine, and in which the influenza virus is of type B.

14. An influenza vaccine eliciting in man or other animals the production of antibodies capable of neutralizing the corresponding influenza virus, comprising a basic-protein-precipitant-influenza virus complex, in which the basic-protein-precipitant is a protamine, and in which the influenza virus is a mixture of types A and B.

LESLIE A. CHAMBERS.

REFERENCES CITED

The following references are of record in the file of this patent:

UNITED STATES PATENTS

| Number | Name | Date |
|---|---|---|
| 2,076,082 | Hagedorn et al. | Apr. 6, 1937 |
| 2,121,900 | Bischoff | June 28, 1938 |
| 2,161,198 | Reiner | June 6, 1939 |

OTHER REFERENCES

Influenza Vaccine by Dalldorf et al.—J. A. M. A., June 7, 1941, page 2574.

"Handbuch der Virusforschung"—Doerr et al. (1938), pages 449–50.

"Outlines of Biochemistry"—Gortner (1929), pages 361–2.

"Studies of . . . Rous Chicken Sarcoma I"—Shemin et al., J. Expt'l Med., 72, Dec. 1940, pages 697 to 705.

Certificate of Correction

Patent No. 2,445,301.

July 13, 1948.

LESLIE A. CHAMBERS

It is hereby certified that errors appear in the printed specification of the above numbered patent requiring correction as follows:

Column 4, line 21, after the word "complex" insert *and*; line 26, for "separate" read *separated*;

and that the said Letters Patent should be read with these corrections therein that the same may conform to the record of the case in the Patent Office.

Signed and sealed this 14th day of December, A. D. 1948.

[SEAL]

THOMAS F. MURPHY,
*Assistant Commissioner of Patents.*